United States Patent [19]
Pompon

[11] 3,902,918
[45] Sept. 2, 1975

[54] METHOD AND DEVICE FOR FEEDING CELLS OF AN ELECTROCHEMICAL BATTERY OF FORCED CIRCULATION TYPE

[75] Inventor: Jean Paul Pompon, Vitry-sur-Seine, France

[73] Assignee: Compagnie Generale d'Electricite, Paris, France

[22] Filed: Dec. 11, 1974

[21] Appl. No.: 531,506

[30] Foreign Application Priority Data
Dec. 11, 1973 France .............................. 73.44188

[52] U.S. Cl. ............................. 136/86 A; 136/86 R
[51] Int. Cl. ......................................... H01m 27/00
[58] Field of Search ...................... 136/86 A, 86 R

[56] References Cited
UNITED STATES PATENTS
3,708,345   1/1973   Loos et al. ...................... 136/86 A

*Primary Examiner*—John H. Mack
*Assistant Examiner*—H. A. Feeley
*Attorney, Agent, or Firm*—Sughrue, Rothwell, Mion, Zinn & Macpeak

[57] ABSTRACT

The invention, which makes it possible to feed in series with electrolyte at a predetermined flow rate and near pressure specified electrochemical cells grouped into identical modules, consists in placing between each module, a pump suitable for compensating the pressure drop in the module immediately upstream, at the same time placing downstream from the assembly of modules a pump suitable for developing a pressure equal to the difference between the said predetermined pressure and half the pressure drop in the module arranged upstream. A pump suitable for creating a pressure drop equal to the sum of the said average pressure and of half pressure drop in the module arranged downstream is also placed upstream from the assembly of the cells.

10 Claims, 3 Drawing Figures

METHOD AND DEVICE FOR FEEDING CELLS OF AN ELECTROCHEMICAL BATTERY OF FORCED CIRCULATION TYPE

BACKGROUND OF THE INVENTION

1. Field of the Invention

The present invention concerns a method for feeding electrolyte to cells of an electrochemical battery of forced circulation type.

It also relates to a device for implementing the said method.

2. Description of the Prior Art

Forced circulation electrochemical batteries are well known and are, at present, the object of numerous researches with a view to equipping non-polluting vehicles.

Among these batteries, air-zinc systems offer encouraging prospects with a view to such applications.

It is briefly stated for reference that a single cell of such a battery comprises a negative electrode, over which an alkaline solution containing zinc powder in suspension flows and on which zinc is oxidized, together with a separator and a positive electrode that is active catalytically with respect to the reduction of oxygen contained in air, this resulting in the appearing of an electromotive force.

In order to constitute a battery, it is therefore necessary to couple such elementary cells electrically and hydraulically together.

Generally, the cells are fed in series with the alkaline solution by means of pumps and these same cells are electrically connected up in series.

In this way, sets of cells known as modules each comprising a limited number of cells are produced and it is, of course, possible to couple such modules together so as to forming a battery having predetermined rated electrical characteristics.

Such assemblies must consequently be fed with electrolyte at a predetermined rate, whose value is a function more particularly of the dimensions of the cells and of the physical characteristics of the said solution.

Moreover, the average pressure of that solution must remain between certain limits imposed more particularly by the pressure of the outside medium, in this case, the atmosphere, and in all cases less than that latter pressure; indeed, the difference in pressure between the atmosphere and the fluid should be such that air may, in all the cells, come readily into contact with the active catalytic part arranged within the said cells and thus generate the electrochemical reaction process.

Moreover, in such batteries, it is necessary, on starting up, to fill the cells rapidly with the solution, and, moreover, lack of priming of the feed pumps, which would cause a reduction or, even, a stoppage in the production of electrical power, must be avoided during operation.

The present invention makes it possible to avoid previously mentioned disadvantages and has as object a method suitable for the feeding in series, with a solution, several cells of an electrochemical battery at a predetermined flow rate and at constant mean pressure, while consuming only a minimum amount of power and operating with great reliability.

The invention has as object a method for feeding in series cells of a forced electrolyte circulation electrochemical battery with a predetermined flow rate and a constant predetermined mean pressure, that battery being of the type in which the said cells are grouped together in assemblies or modules, each comprising the same number of cells, that method consisting, more particularly, in:

placing, between each module and the module situated downstream, at least one pump installed in the circuit, suitable for compensating the pressure drop occuring in the module arranged upstream; characterized in that:

at least one pump, suitable for developing at the said predetermined flow rate, a pressure equal to the difference between the said predetermined mean pressure on the one hand and half the pressure drop in the module, arranged upstream, on the other hand.

At least one pump, suitable for developing at the said predetermined flow rate, a pressure drop equal to the sum of the said predetermined mean pressure on the one hand and of half the pressure drop in the module arranged downstream on the other hand, is placed upstream from the assembly of said modules.

The invention also concerns a device for implementing the said method.

In the following text, a method and device for feeding the cells of an air-zinc electrochemical battery with electrolyte, it being understood that the invention may be applied to other batteries implementing other solutions and different metallic powders, without forasmuch going beyond the scope of the said invention, will be described by way of an example of embodiment.

Such a description will therefore be made with reference to the accompanying diagrams.

DESCRIPTION OF THE PREFERRED EMBODIMENT

Figure 1:
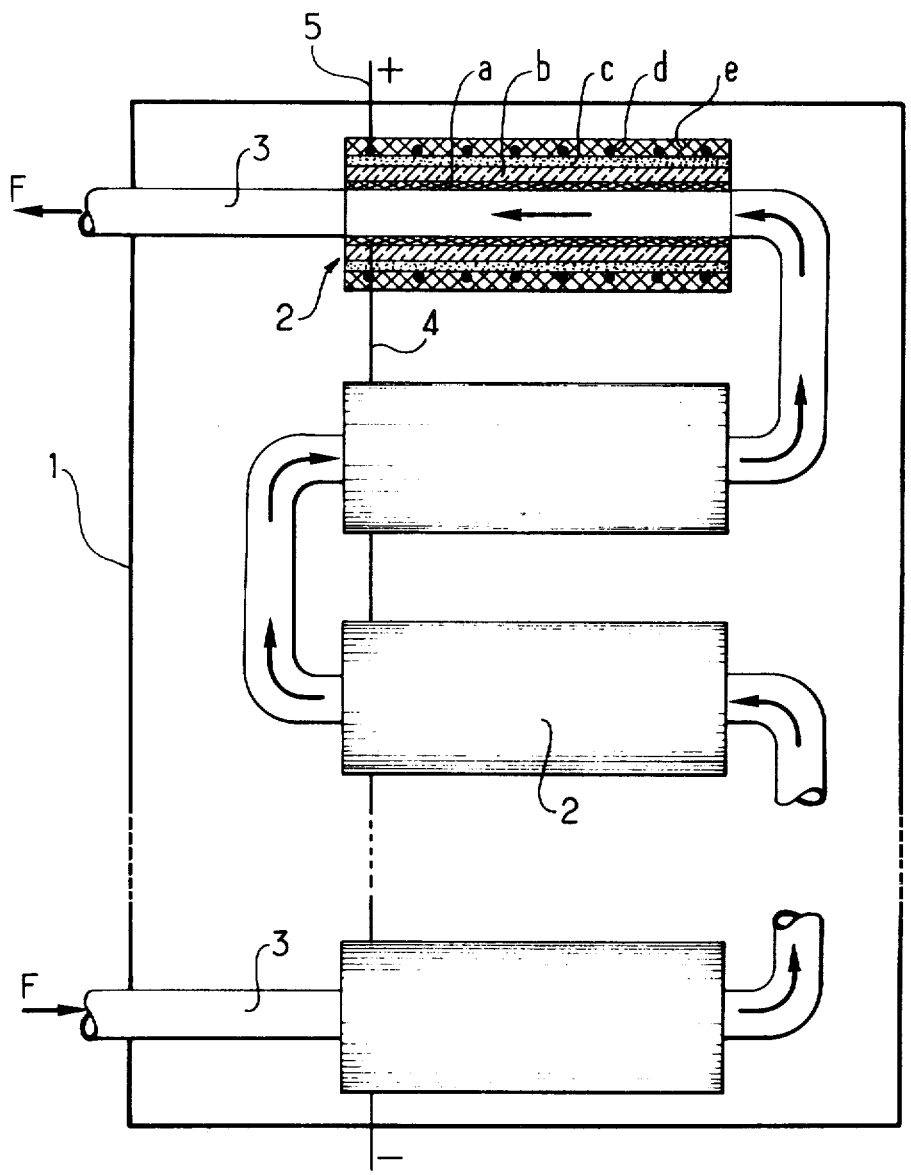
FIG. 1 is a partial schematic, partial sectional view of the structure of a module formed by cells implemented according to the invention.

FIG. 1 shows, therefore, a module 1, constituted by a certain number $n$ of cells 2 which are substantially identical to one another, fed in series with a potassium hydroxide solution containing zinc powder in suspension, such feeding being effected through tube 3 and being materially shown by the arrows F.

Such cells are, for example, of the type described by the Applicant in his French application No. 71. 45 734 of Dec. 20, 1971, as well as in the applications for additions 72. 22 961 of June 26, 1972, and No. 73. 137 65 of April 24, 1973, for "Forced flow electrochemical generator."

It is mentioned for reference, on that subject, that each of the said cells 2 comprises a negative collector grid $a$, a porous separator $b$, a porous active catalytic layer $c$, and a positive collector grid $d$ coated with a porous water repellant layer $e$. Such cells are therefore traversed throughout their while length by a solution of potassium hydroxide and zinc powder in suspension, as shown and the overall reaction consisting of electrochemical oxidation of the zinc by oxygen of the outside air generates an electromotive force between the grids $a$ and $d$. It must be understood that the cells shown are electrically connected in series by means of conductors 4, the electromotive force generated by such a module being collected at the terminals of external connections 5.

It will be observed, however, that the number of cells 2 in a module is limited alternately by the pressures drop generated in the said cells by the flow of solution.

Indeed, if the pressure drop in a cell is designated as $p$, it will be seen that in the module 1, the pressure drop is $np$, $n$ being the number of cells of the module.

Consequently, the cell furthest downstream from the module, the pressure is slightly greater than in the other cells and it is necessary that this pressure should not exceed certain limits so that the outside air solution interface may be maintained in the catalytic layer $c$ in the correct manner. It can therefore be seen that the value of $n$ is limited by such a resctriction.

In other words, if the average pressure of the solution in a module is designated as $P_m$, it is necessary for that pressure to remain within certain limits, while being at the same time slightly lower than the atmospheric pressure.

Figure 2:
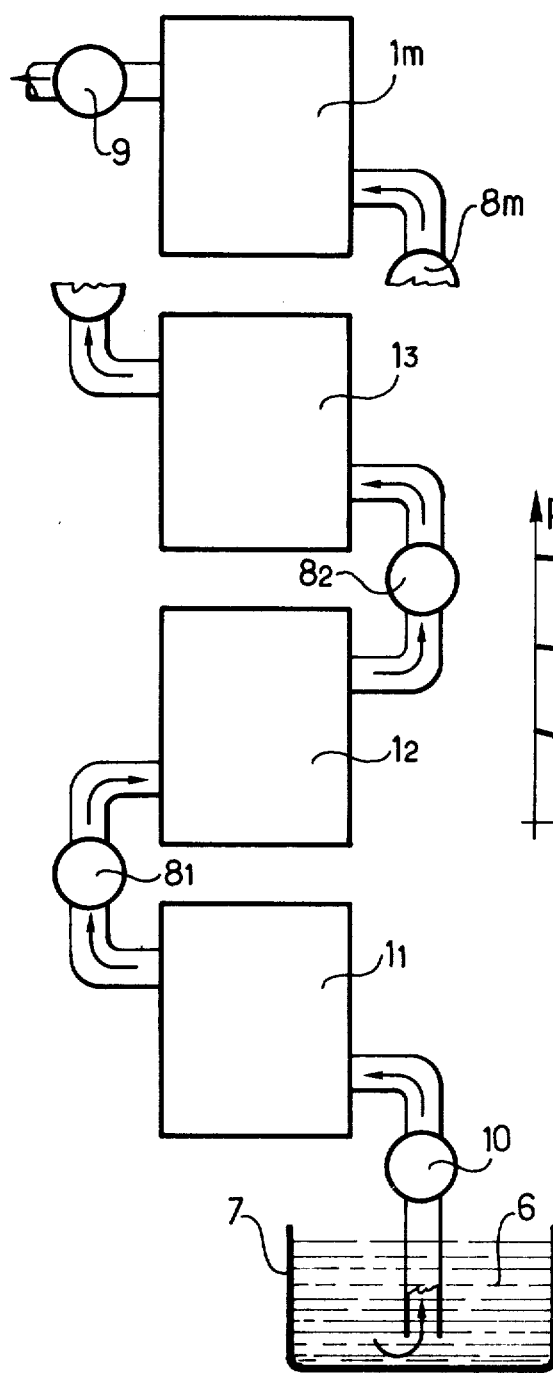
FIG. 2 is a schematic view of a device according to the invention.

FIG. 2 shows an electrochemical generator formed by several modules $1_1$, $1_2$, $1_3$, ... $1_m$, substantially identical, fed with a potassium hydroxide solution 6 containing zinc powder in suspension, such a solution being contained in a tank 7.

Pumps $8_1$, $8_2$, ... $8_m$, installed in the circuit, are placed between each of the modules, whereas a pump 9 is installed downstream from the last module $1_m$ and a pump 10 is placed upstream from the first module $1_1$.

The pumps $8_1$, $8_2$, ... $8_m$ have substantially identical characteristics, whereas the pumps 9 and 10 have different characteristics, as will clearly be explained in the following text. All these pumps may be driven by a common shaft, or else the said pumps may be driven independently from one another.

Figure 3:
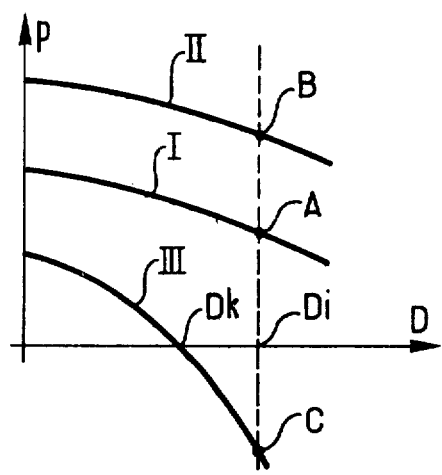
FIG. 3 is a plot which shows the characteristics at the pumps implemented according to the invention.

FIG. 3 shows the pressure $(p)$ and rate of flow $(D)$ diagram of the pumps implemented. More precisely, the curve I represents the characteristics of the pumps $8_1$, $8_2$ ... $8_m$. The curve II represents the characteristics of the pump 9, whereas the curve III concerns the pump 10.

If the rated flow of the potassium hydroxide and zinc solution in the cells is designated as $Di$, that flow being of necessity predetermined more particularly by the dimensions of the cells and of the physical characteristics of the said solution itself. Moreover, as previously mentioned, in each of the modules, a pressure drop $n\Delta p$ occurs and, moreover, it is necessary for a difference in mean pressure $P_m$ to prevail between the ambient atmosphere and the inside of each module so that air may reach the active layer $c$ of each of the cell, the atmospheric pressure being taken as the origin of the pressures and consequently assumed to be equal to 0.

The pumps $8_1$, $8_2$ ... $8_m$ therefore each ensure compensation of the pressure drop $np$ in each module arranged upstream and it is seen in FIG. 3 that the distance $AD_i$ is equal to $n\Delta p$.

It ensues, from these considerations, that the pressure at the input of a module is $-Po$ and is, at the output, $-Po + n\Delta p$.

The average pressure $Pm$ in a module is therefore substantially $$Pm = -Po - \frac{n\Delta p}{2}$$

The pump 9 which ensure the passage of the solution towards the outside medium, that is, towards the tank 7, should therefore supply a pressure $Po + n\Delta p$, this being represented by the distance $BDi$ in FIG. 3, the said pressure being, moreover, equal to $-(Pm + (n\Delta P/2))$.

Inasmuch as concerns the pump 10, its function is substantially as follows:

At start up, the modules $1_1$ ... $1_m$ are filled with air and it is necessary to prime the pumps $8_1$ ... $8_m$ and 9. On considering, therefore, curve III, therefore, it will be seen that the said pump 10 ensures a flow, on starting, up to the point Dk where the other sucessively primed pumps begin to operate. At that juncture, the characteristic $P(D)$ of the pump 10 becomes negative and is materially shown, for the rated flow $Di$, by the point C. The said pump 10 is constituted in such a way that, for the flow $Di$, the distance $DiC$ is precisely equal to the distance $AB$, that is, $-Po$ or $Pm + n\Delta p$; consequently, it sets up, at that moment a pressure drop equal to $Po$ in the circuit as a whole and hence maintains the average pressure $Pm$ necessary for the correct operation of the cell. It will be observed, moreover, that in the portion $DkC$ of the curve III, the pump 10 does not theoretically consume any energy, since it creates a pressure drop rather than a head of pressure.

It is also quite evident that any lack of priming in any pump will cause a reduction in the overall rate of flow and the action of the pump 10 will than compensate immediately such an occurrence, its characteristic then becoming positive.

The method and the device which are the objects of the invention therefore ensure feeding of the cells as a whole under a constant difference of mean pressure compared with that of the outside medium, while compensating the pressure drops and avoiding lack of priming.

By way an example of embodiment, four modules each comprising 12 cells have been electrically and hydraulically connected up in series.

The battery thus constituted supplies a voltage of 48 volts and a power of 3 kwatts.

The previously defined parameters are:

$Po$ = 40 millibars,
$\Delta P$ = 10 millibars,
$n\Delta p$ = 120 millibars,
$Pm$ = -100 millibars.

the rated flow of solution being 1 cu. m per hour approximately.

It must be understood that the inventionis in no way limited to the embodiments described and illustrated, which have been given only by way of an example. More particularly, without going beyond the scope of the invention, details may be modified, certain arrangements may be changed or certain means way be replaced by equivalent means.

I claim:

1. In a method for feeding in series, cells of a forced fluid flow electrochemical battery with a predetermined flow rate and a constant predetermined average pressure, that battery being of the type in which said cells are grouped together in modules, each comprising the same number of cells and wherein said method includes the step of placing, between each module ($1_1$) and the module ($1_2$) situated downstream, at least one pump $8_1$ installed within the circuit and operating said pump for compensating the pressure drop ($n\Delta p$) occurring within the module ($1_1$) arranged upstream thereof; the improvement comprising the steps of:

placing at least one pump (9) for developing, at said predetermined flow rate ($Di$), a pressure equal to the difference between said predetermined mean pressure ($Pm$) on the one hand and half ($n\Delta p/2$) the pressure drop in the module (1m) immediately upstream thereof downstream of the last module 1m in said series; and placing at least one pump (10) for developing, at said predetermined flow rate ($Di$), a pressure drop ($Po$) equal to the sum of said predetermined mean pressure ($Pm$) on the one hand and of the half ($n\Delta p/2$) the loss of pressure in the module 11 immediately downstream thereof, upstream of the first module $1_1$ of said series.

2. In a forced fluid flow electrochemical battery device comprising a series of modules consisting of groups of the same number of electrochemical cells, said device being characterized in that it comprises:

a tank (7) for containing the said fluid (6), at least one pump (8) installed within the circuit, for compensating the pressure drop ($n\Delta p$) occurring within the module ($1_1$) arranged upstream thereof;

at least one pump (9) arranged downstream from the last module $1_m$ in said series for developing for said predetermined flow rate ($D_i$) a pressure equal to the difference between said predetermined mean pressure ($P_m$) on the one hand and half ($n\Delta p/2$) the pressure drop in the module ($1_m$) arranged upstream thereof on the other hand; and at least one pump (10) arranged upstream of the first module $1_1$ of said series for developing, for said predetermined flow rate ($D_i$), a pressure drop $P_o$ equal to the sum of said predetermined mean pressure ($P_m$) on the one hand and half ($n\Delta p/2$) the loss of pressure in the module ($1_1$) arranged downstream thereof on the other hand.

3. A device according to claim 2, wherein: said fluid (6) is the electrolyte of the electrochemical generator containing a metallic powder in suspension.

4. A device according to claim 3, wherein: said metallic powder is zinc powder.

5. A device according to claim 2, wherein: said predetermined average pressure ($P_m$) has a different value from atmospheric pressure.

6. A device according to claim 2, wherein: said pumps are rotary pumps including rotors and have their rotors driven by a common shaft.

7. A device according to claim 6, wherein: said rotors are driven at the same speed and have different dimensions.

8. A device according to claim 6, wherein: said rotors are driven at different speeds and have substantially identical dimensions.

9. A device according to claim 2 wherein: an independent drive motor is connected with each of the pumps ($8_1, \ldots 8_m, 9, 10$).

10. A device according to claim 2, wherein: said fluid (6) is lead out from the last module and is recycled to the said tank (7).

* * * * *